Patented Jan. 21, 1930

1,744,348

UNITED STATES PATENT OFFICE

JOHN F. WERDER, OF CLEVELAND, OHIO, ASSIGNOR OF ONE-HALF TO EDMUND ROGERS, OF CLEVELAND, OHIO

SEALING COMPOSITION

No Drawing.    Application filed December 29, 1926.    Serial No. 157,876.

This invention relates to sealing compositions which may be employed to seal gaskets and joints of various kinds.

It has long been sought to provide a suitable sealing composition for use on the cylinder head gaskets of automobiles, on radiator hose connections, crank-case and transmission cover gaskets, and the like, in the automobile industry, and for use with pipe joints for conveying steam, etc. which would produce a tight seal between the parts which are to be packed with regard to each other, and which would readily yield and permit the separation of these parts when desired.

Compositions of various types have been proposed for this purpose. In particular in the automobile industry shellac has been employed for sealing gaskets for cylinder heads and transmission covers. This shellac was employed to hold the gasket in place on one of the metal parts, and it was customary to provide a heavy grease coating on the other surface of the gasket so that a later separation could be accomplished. Even with such an arrangement, however, it was necessary in most instances to destroy the gasket in order to separate it from the metal to which it was attached by shellac.

White lead and litharge have likewise been proposed, but with each a similar difficulty arises.

It has furthermore been proposed to provide a sealing composition which was employed with cylinder head gaskets of automobiles and which at the temperature of the automobile engine block was carbonized so that it would expand or "puff" to tightly seal the joint between the metal members involved. Such a material was prepared with water, and was usually employed as a trick paste, which could not be readily distributed upon the surface involved. When it was thinned by diluting with water, the mixture would "creep" upon the surfaces, since the latter usually were greasy, and form globules or balls so that a seal was not attainable, especially with the narrow surfaces of engine blocks.

In distinction from such known compositions, the present invention provides a mixture which is of syrupy consistency, and while involving an aqueous solution to determine its fluidity, at the same time does not "creep" or "crawl" when placed on a greasy surface. It furthermore does not require a carbonization when employed with an automobile engine block gasket, and hence permits the parting of the gasket from both metal surfaces without damage, even after long exposure to the temperatures of the cooling system of the engine.

The present composition is composed of a solid lubricating material in finely divided or powdery condition, a binder, and an aqueous solution of a compound which prevents freezing or rapid drying-out; together with grease solvent agent to prevent "creeping".

The composition may be varied considerably according to the conditions to be met, but it is preferred to employ substantially the following proportions:

3 parts of dextrine,
9 parts of finely flaked graphite,
7 parts of aqueous calcium chloride solution of 1,220 sp. gr.

These ingredients are combined by placing all of the calcium chloride solution in a vessel with one-half of the graphite. The remaining graphite and dextrine are mixed thoroughly while dry and then added to the mixture in the vessel while agitating very thoroughly. The resulting mixture is a heavy liquid resembling corn syrup in consistency and possessing remarkable adhesive qualities. It is preferred to add to this mixture about ½ part of a grease solvent such as carbon tetrachloride, gasoline, oil, thin grease, etc., during the agitation, whereby a uniform and homogeneous emulsion of the various components is produced: the tendency of the entire mixture to creep is thereby entirely overcome. It has been found that even larger quantities of grease solvent may be admixed without difficulty.

Such a mixture may be produced in general according to the prescription of my patent No. 1,353,197 by the substitution of graphite for the abrasive.

The dextrine is known on the market by a great number of names, and is produced from starch by various methods. It is intended in the above example as an instance of a non-fermentable material employable as a binder to form a mixture of adhesive properties.

It is possible to employ commercial dextrine or to make up this non-fermentable material by boiling or treating raw starch during the course of preparing the sealing composition. In case raw starch is worked up into this product, or in any event where any foreign fermentable material might be present, it is desirable to add a very small quantity of formaldehyde to prevent any decomposition by fermentation. The graphite is employed as a lubricant and body material in the mixture. The calcium chloride in the mixture prevents rapid drying and insures the product against frost damage during extremely cold weather, and in a shipping container. The calcium chloride aqueous solution at the given concentration has a boiling point of about 223½° F. so that the mixture is not dried out and baked at the temperatures prevailing within the engine block, although the boiling point of water may be oftentimes exceeded therein. It may be mentioned that in practice after several weeks the small balls of this material which are squeezed out in placing a cylinder head gasket are still soft.

This material is easily applied by a brush or dauber to any surface, even an inclined or vertical one, and is of such adhesive property that in the latter instance it will sustain a gasket of considerable weight and in a proper location without the employment of any other holding means. This is of great assistance to the mechanic in properly locating and seating a gasket upon transmission casings and in placing gaskets for sealing vertically disposed valve chamber closing plates.

This mixture is further adapted for use in sealing pipe and other joints, and it has been found that upon heating, the mixture expands slightly and fills up any small pores in the metal or defects in the gasket, producing a perfectly tight seal; and with the particular composition of the example, it produces such a seal even at the temperature of boiling water.

After a gasket has been in place for some time, it is possible to separate the metal parts from the gasket immediately in view of the continued plasticity of the material even under the heating conditions prevailing in the engine block of an internal combustion engine.

The non-fermentable properties of the dextrine prevent a rotting or deterioration of the material when kept for a long time. During the manufacture of the dextrine, it is customarily subjected to temperatures of between 400 and 500° F., and since most of the gasket connections on an automobile engine are not raised to such a temperature, it is clear that the body of the material is in no wise destroyed or carbonized during use, whereby a sticking or cementing of the gasket to the adjacent metal surfaces might occur; and by virtue of the nature of the composition such carbonizing is not necessitated to complete the seal.

The mixture has also been found valuable to prevent corrosion of battery terminals and may be poured evenly over the terminal, whereupon it will be found that in a few days a protective coating results which will not readily wash off or run off.

It is apparent from this disclosure that the invention is not limited to the specific materials or preparations employed, but that it may be modified within the scope of the appended claims.

What is claimed as new is:

1. A sealing composition in fluid and adhesive form containing graphite, dextrine, and calcium chloride.
2. A sealing composition in fluid form containing graphite, dextrine, and an aqueous solution of calcium chloride.
3. A sealing composition which is non-creeping and of syrupy consistency and contains graphite, dextrine, calcium chloride and a grease solvent.
4. A sealing composition containing three parts of dextrine, nine parts of finely flaked graphite, and seven parts of calcium chloride solution of 1.220 sp. gr.

In testimony whereof, I affix my signature.

JOHN F. WERDER.